(12) United States Patent
Jacob (10) Patent No.: US 7,190,828 B2
(45) Date of Patent: Mar. 13, 2007

(54) COLOR RENDERING (75) Inventor: Steve A. Jacob, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 798 days.

(21) Appl. No.: 10/651,139

(22) Filed: Aug. 28, 2003

(65) Prior Publication Data
US 2005/0047649 A1 Mar. 3, 2005

(51) Int. Cl.
G06K 9/00 (2006.01)
(52) U.S. Cl. ........................ 382/162; 382/167
(58) Field of Classification Search ................ 382/162, 382/167; 358/1.9, 518, 523
See application file for complete search history.

(56) References Cited

U.S. PATENT DOCUMENTS

| 5,611,030 | A |  | 3/1997 | Stokes |
| 5,995,653 | A |  | 11/1999 | Reed et al. |
| 6,005,968 | A | * | 12/1999 | Granger ...................... 382/162 |
| 6,031,628 | A |  | 2/2000 | Jacob et al. |
| 6,075,888 | A |  | 6/2000 | Schwartz |
| 6,205,246 | B1 |  | 3/2001 | Usami |
| 6,249,315 | B1 | * | 6/2001 | Holm ......................... 382/167 |
| 6,340,975 | B2 |  | 1/2002 | Marsden et al. |
| 6,351,320 | B1 |  | 2/2002 | Shin |
| 6,360,007 | B1 |  | 3/2002 | Robinson et al. |

OTHER PUBLICATIONS

"Development and Testing of a Color Space (IPT) with Improved Hue Uniformity", Ebner et al., The Sixth Color Imaging Conference: Color Science, Systems, and Applications, Copyright 1998, IS&T, pp. 8-13.

* cited by examiner

Primary Examiner—Phuoc Tran (57) ABSTRACT

One method embodiment of processing color data includes rendering the color data into two color spaces in sequence before transfer to an output stream. Input data is rendered into a color image within an intent and format independent working color space. The color image is then rendered into a media dependent color space.

28 Claims, 5 Drawing Sheets

```
202                 204              206
RGB                 CMYK             INTENT
COLOR               COLOR            DATA
DATA                DATA
```

222 RENDERING PROCEDURE

224 INTENT LIBRARY

| 305 CMYK DEFAULT | 307 CMYK DEVICE |
|---|---|

| 302 DEFAULT LOOK-UP TABLE | 304 RGB DEVICE LOOK-UP TABLE | 306 SWOP LOOK-UP TABLE | 308 EURO. STD. PRESS LOOK-UP TABLE |

218 INTENT AND FORMAT INDEPENDENT WORKING COLOR SPACE | 310 SECOND IMAGE

226 RENDERING PROCEDURE

228 MEDIA TYPE LIBRARY

| 312 STANDARD | 314 PREFERRED | 316 PHOTO QUALITY | 318 GLOSS |

220 MEDIA DEPENDENT WORKING COLOR SPACE | 320 THIRD IMAGE

322 TRANSFER PROCEDURE

214 PRINT ENGINE

COLOR RENDERING

BACKGROUND

Color data representing an image having a known intent, format, and gamut, such as sRGB (standard red, green and blue), can be rendered into color data representing a color image in a desired format with a different gamut, such as a media specific CYMK, prior to printing. Such color rendering can be performed by a plurality of mappings using information contained within a plurality of look-up tables.

Due to the large number of input color formats, desired rendering intents, and desired media types, a large number of color look-up tables may be required. In particular, the number of mappings required results in a multiplication of the number of color look-up tables required to properly support all of the combinations of input format, rendering intent, and media types. Unfortunately, a significant cost is associated with the production of each table. Additionally, a further cost is associated with each look-up table, in that each look-up table must be maintained in memory so that it will be available for use by the rendering procedure.

As a result, a color rendering method and apparatus which could reduce the number of look-up tables required, while maintaining the functionality of the color rendering process, would be a significant advancement.

SUMMARY

One method embodiment of processing color data includes rendering the color data into two color spaces in sequence before transfer to an output stream. Input data is rendered into a color image within an intent and format independent working color space. The color image is then rendered into a media dependent color space.

BRIEF DESCRIPTION OF THE DRAWINGS

The same reference numbers are used throughout the drawings to reference like features and components.

DETAILED DESCRIPTION

In some embodiments, color data is rendered into two color spaces in sequence before transfer to an output stream. First, input data is rendered into a color image within an intent and format independent working color space. Next, the color image is rendered into a media dependent color space. As will be seen, rendering color data is in this manner requires only the additive sum of the number of color mapping tables from which a selection may be made for each mapping, rather than the multiplicative product of the number of tables for each mapping, as is the case in prior systems. Accordingly, an overall number of color mapping tables is considerably less than known color mapping methods.

Figure 1:
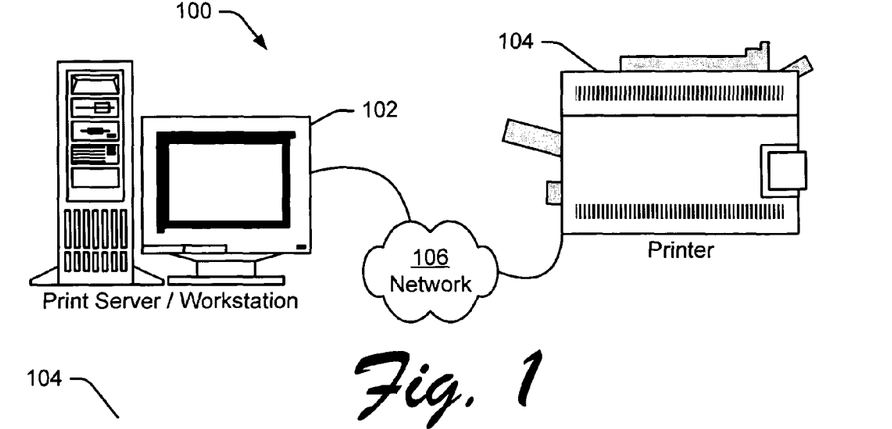
FIG. 1 is a network environment showing an exemplary implementation of a printer configured to perform color mapping.

FIG. 1 is a network environment 100 showing an exemplary printer configured to perform color mapping. A workstation or print server 102 is configured to communicate with a printer 104 over a network 106. While the printer 104 is illustrated as an example of a typical hardcopy output device, similar output devices, such as a multifunctional peripheral or document copier could be substituted. In a first implementation, a color mapping apparatus is present on the printer 104, while in a second implementation, the color mapping apparatus is present on the print server or workstation 102.

Figure 2:
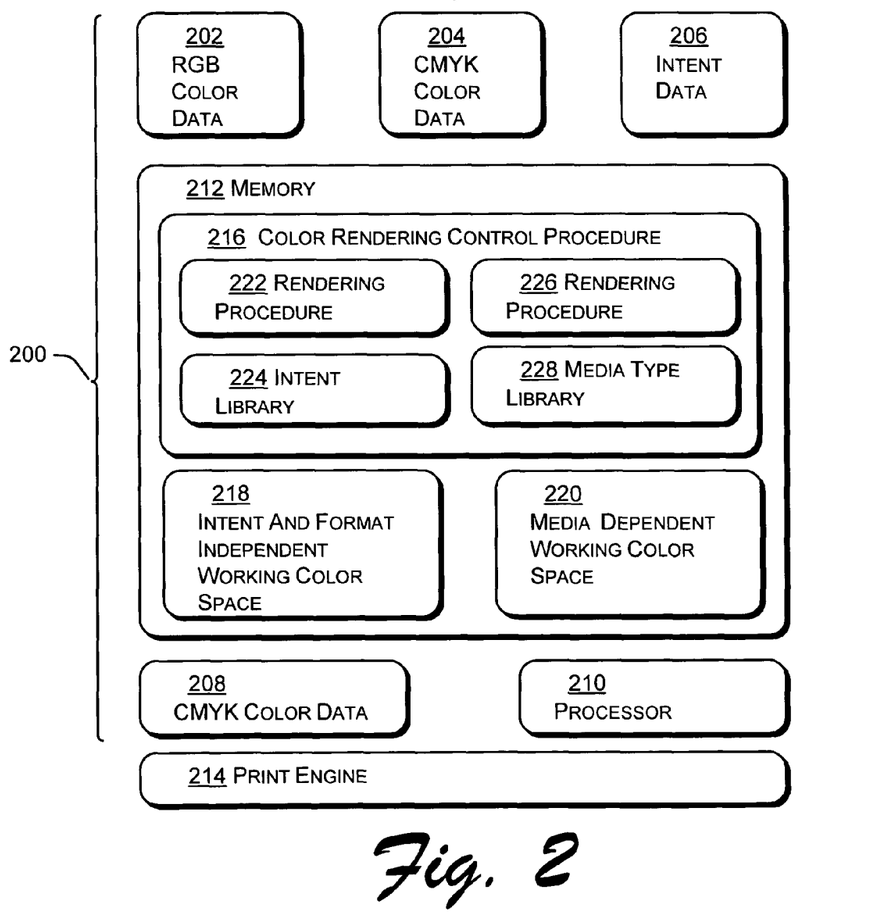
FIG. 2 is a block diagram illustrating an exemplary implementation of a color rendering apparatus.

FIG. 2 is a block diagram illustrating exemplary detail of a color mapping apparatus 200 on the printer 104. While the implementation of the color mapping apparatus 200 seen in FIG. 2 is located within the printer 104 of FIG. 1, it could alternatively be located in a print server 102, a workstation or other location. The color mapping apparatus 200 is configured to receive color data (i.e. a first, or input, image) as input. Such input may include RGB color data 202 or CMYK color data 204, along with intent data 206.

An overview of the operation of the structures seen in FIG. 2 is helpful. The input data 202, 204, 206 is mapped a first time into an intent and format independent working (i.e. transitional storage location) color space 218. After the first mapping, the input data is no longer dependent on intent data 206, since the intent data was used in the first mapping process, and is no longer relevant. Similarly, the data mapped for the first time into the intent and format independent working color space 218 is no longer dependent on the original format, such as RGB or CMYK, since the data has been mapped into the format (e.g. CIE CAM 97s Jab) of the intent and format independent working color space 218. Once mapped into the intent and format independent color space 218, the data may be mapped a second time, this time to a media dependent working color space 220 using media specifying information or instructions. Accordingly, the data within the media dependent working color space 220 is dependent on the media (e.g. photographic paper or copy machine paper) to be used during the printing process for proper output results. During the printing process, CMYK color data 208 is removed from the media dependent working color space 220 and processed by a print engine 214.

A more detailed examination of the structures seen in FIG. 2 is also helpful. In an exemplary implementation, a printer 104, configured with an exemplary color mapping apparatus 200, includes a processor 210, one or more memory devices 212, and a print engine 214. A color rendering control procedure 216 is configured to receive input data representing a first image, such as contained within RGB color data 202 or CMYK color data 204 and intent data 206. The color rendering procedure 216 also performs a rendering to create a second image within an intent and format independent working color space 218. An intent and format independent working color space 218 is a color space wherein the input formats have been translated into the working color space formats and the rendering intent associated with the input color data 202, 204 has been applied to the image during the translation into the intent and format independent working color space 218. For example, an input image could contain RGB color data and a saturation rendering intent. The input image could then be rendered into the intent and format independent working color space 218. The format of the intent and format independent working color space 218 could be, for example, CIE CAM 97s Jab. After translation into the intent and format independent working color space 218, no intent would be associated with the image, since the intent (e.g. saturation) associated with the input data would already be reflected in the data associated with the image within the intent and format independent working color space 218. Thus, the image within the intent and format independent working color space 218 is intent independent. Similarly, the format of the data within the intent and format independent working color space 218 is independent of the input format (e.g. RGB or CMYK) and is in the format of the intent and format independent working color space 218, (e.g. CIE CAM 97s Jab). The gamut of the intent and format independent working color space 218 is large enough to contain all of the gamuts of all possible media dependent working color spaces 220, but it is also fixed in size. The fixed size of the intent and format independent working color space 218 facilitates the rendering process. For example, where RGB color data 202 to be rendered is fully saturated, it will be on the surface of the RGB color gamut. The rendering procedure 222 uses a look-up table having a desired rendering intent which was obtained from intent library 224 to map the input data 202 onto the surface of the intent and format independent working color space 218. The ability of the rendering procedure 222 to expand the input colors to the surface of the intent and format independent working color space 218 and/or compress input colors to locations within the intent and format independent working color space 218 guarantees that the colors with maximum saturation from input color space are rendered to colors with the maximum saturation in the intent and format independent working color space 218.

The color rendering control procedure 216 also contains a rendering procedure 226 which is configured to render the second image, contained in the intent and format independent working color space 218, into a third image contained within the media dependent working color space 220. As one step in the rendering process, the rendering procedure 226 is configured to obtain a color map from the media type library 228 consistent with the desired media type to perform the rendering process. As seen above, by including media information in the rendering process, the rendering procedure 226 makes the resulting data stored within the media dependent working color space 220 dependent on the media used during the printing process. For example, data from the media type library 228 may have caused, during the rendering process, the data sent to the media dependent working color space 220 to be dependent on the use of photographic paper or standard copy machine paper for proper output.

Figure 3:
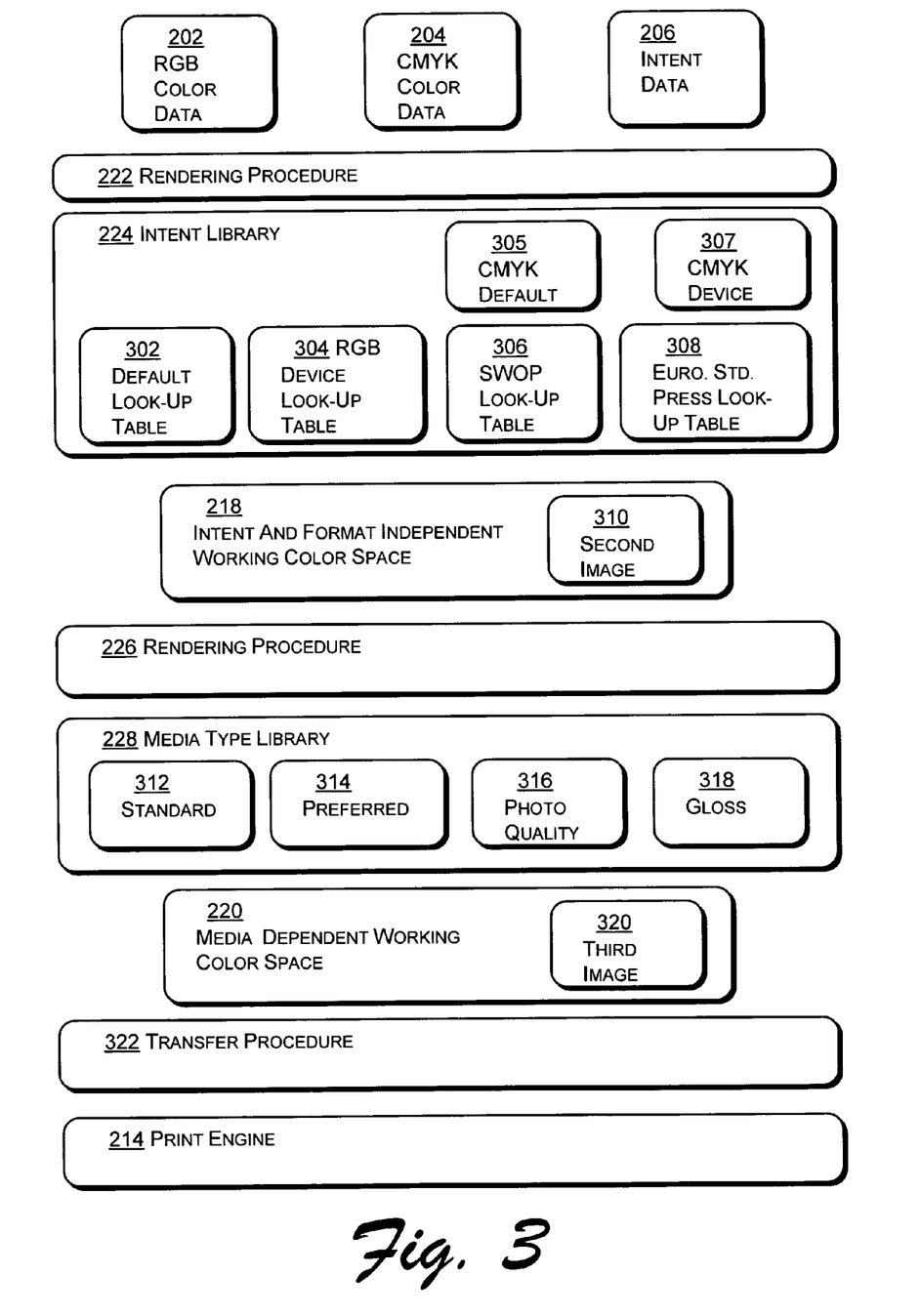
FIG. 3 is an enlarged block diagram illustrating an exemplary implementation of components seen in FIG. 2 in greater detail.

FIG. 3 is an enlarged block diagram illustrating some of the components seen in FIG. 2 in greater detail. Color data such as RGB 202 or CMYK 204 color data is typically sent to the printer 104 from a workstation or print server 102 in response to a user's printing request. Color data is frequently in an RGB format due to the tendency of CRT or similar type monitors to use this format. Similarly, color data may be in a CMYK format due to the tendency of PostScript® or similar page description languages to use this format.

The rendering procedure 222 is configured to—upon receiving the color data 202, 204—consult intent data 206 accompanying the color data to determine the rendering intent of the print job owner, print job author, or other authority. Having determined the desired rendering intent, the rendering procedure 222 is configured to select a look-up table from the intent library 224 that supports color mapping according to the desired rendering intent. In the exemplary implementation of FIG. 3, the intent library 224 includes look-up tables which support RGB default 302, RGB device 304, CMYK default 305, SWOP 306 (specifications web offset printing), CMYK device 307 and European standard press 308 rendering intents.

The intent library 224 is exemplary in nature, having a plurality of look-up tables which could be supplemented or substituted for, where required by the constraints of a particular application. The RGB default look-up table 302 is used where specifically requested, or in the event that no other look-up table is requested. The RGB device look-up table 304 is used where the rendering intent that is best supported by the print engine is preferred. The CMYK SWOP look-up table 306 is used where SWOP characteristics are desired. The CMYK European standard press look-up table 308 is similarly used where these rendering intent characteristics are desired.

The rendering procedure 222 is configured—upon selection of a look-up table from the intent library 224—to render a first image defined by the color data 202 or 204 into a second image 310 consistent with the intent and format independent working color space 218. Color data rendering from the input color space, 202 or 204, to the intent and format independent working color space 218 may be implemented by use of the look-up tables in the intent library 224. The intent and format independent working color space 218 may be defined within IPT color space, Lab color space, XYZ color space, CIE CAM 97s Jab or any other desired color space. Once mapped into the intent and format independent working color space 218, the color data will have been modified in a manner consistent with the intent data 206. Accordingly, the data within the intent and format independent working color space 218 is no longer dependent on any intent data, intent flag or intent indicator, since the rendering was performed taking into account the desired rendering intent.

The rendering procedure 226 is configured to render the second image 310—contained within the intent and format independent working color space 218—according to the media type that will be used in the printing process. For example, in a printer wherein a number of different paper trays—each including a different media type—are available, the rendering procedure 226 determines to which media type the print job is destined. Having determined the media type, the rendering procedure 226 is configured to select a look-up table from the media type library 228 that supports the desired media type. In the exemplary implementation of FIG. 3, the media type library 228 includes look-up tables which support standard media 312, preferred media 314, photo quality media 316 and gloss media 318. Other look-up tables could be added or substituted—as needed—to correspond to the availability of different types of media.

The rendering procedure 226 is configured, upon selection of a look-up table from the media type library 228, to render the second color image 310 from the intent and format independent working color space 218 into a third color image 320 consistent with the media dependent working color space 220 using the look-up table selected from the media type library 228. The media dependent working color space 220 may be defined through the use of an IPT color space, a Lab color space, an XYZ color space, or any other desired color space. Consistent with having been rendered into the media dependent working color space 220, the third color image 320 will have been modified in a manner that will produce expected results using the media selected for the printing process.

A transfer procedure 322 is configured to transfer device ready bits from the CMYK color data associated with the third color image 320 within the media dependent color space 220 to the print engine 214.

Figure 4:
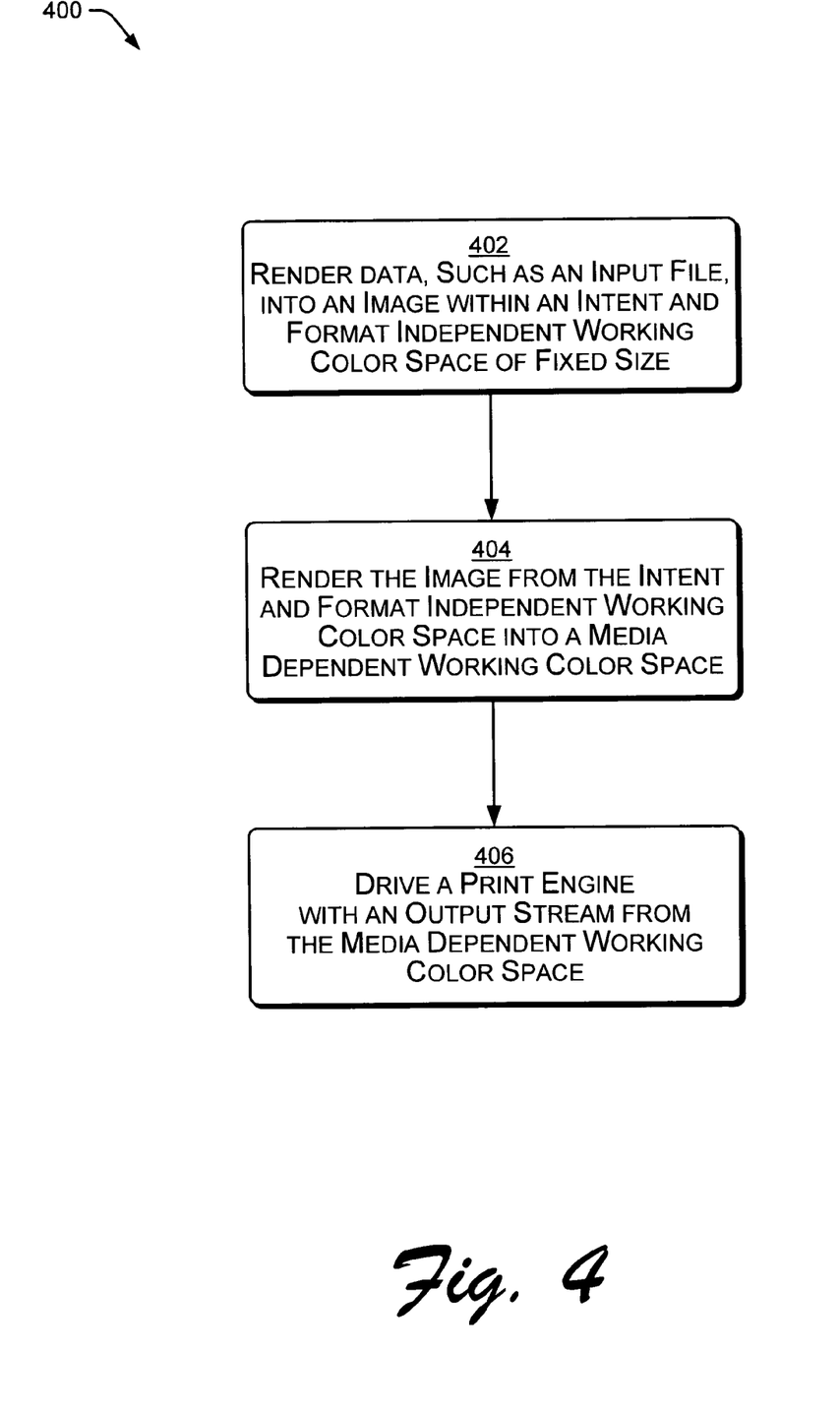
FIG. 4 is a flow diagram that describes an exemplary implementation for mapping color data.

The flow chart of FIG. 4 illustrates an exemplary implementation of a method 400 for rendering color data. At block 402, an input file, color image or other data is rendered into an image 310 within an intent and format independent working color space 218. This rendering may be performed in a manner indicated by a particular application. For example, the input file or first color image received may be in the form of RGB 202 or CYMK 204 data sent by a workstation or print server 102. The data may be rendered into an intent and format independent color work space 218 by use of a look-up table, such as the default table 302, selected from an intent library 224 which is consistent with intent data 206 sent with the input data. By rendering the data using the look-up table from the intent library 224, the image 310 is no longer associated with an intent file, flag or indicator, and the original intent data is essentially "built into" the data 310 within the intent and format independent working color space 218. Similarly, rendering the data 202 or 204 into the image 310 results in independence from the previous format (e.g. RGB) by rendering the data into a new format such as IPT, Lab CIE CAM 97s Jab or other color space.

Note that due to the fixed size of the intent and format independent working color space 218, fully saturated colors in the input data 202, 204 will be mapped to colors on the edge of the intent and format independent working color space 218.

At block 404, the second image 310—contained in the intent and format independent working color space 218—is rendered into a third image 320, contained within a media dependent working color space 220. This rendering may also be made in a manner indicated by a particular application, such as by use of a tool such as rendering procedure 226. For example, the color data within the intent and format independent working color space 218 may be transformed into color data within a media dependent color work space 220 by use of a look-up table, such as the standard table 312, selected from a media type library 228. The format of the media dependent working color space 220 may be based on an IPT, Lab or other color space.

At block 406, data associated with the third image 320, defined within the media dependent working color space 220, is fed into an output stream. For example, CMYK data 208 may be sent to print engine 214. In particular, the data may be fed by a transfer procedure 322 to the print engine 214 or other consumer of data.

Figure 5:
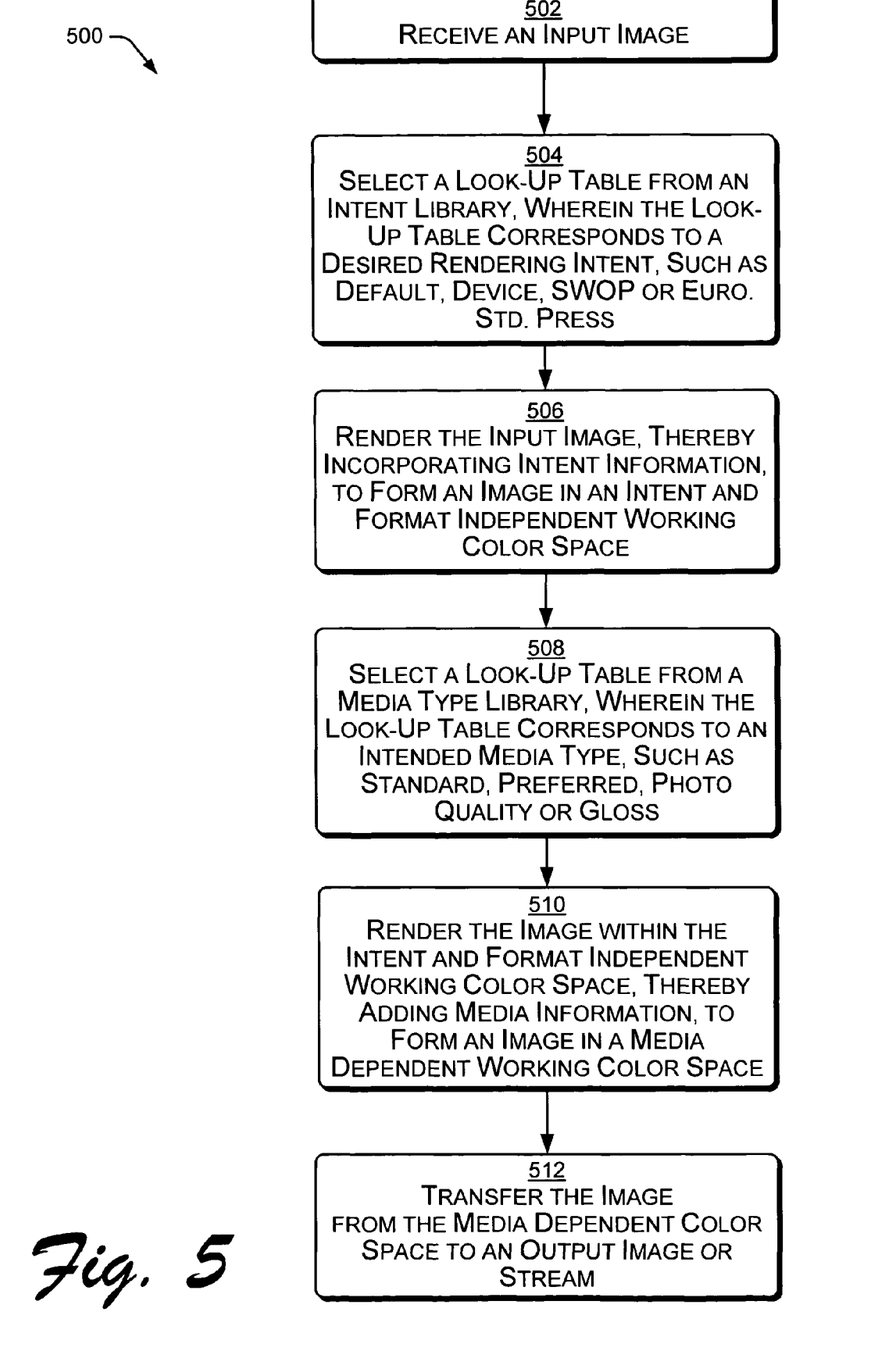
FIG. 5 is a flow diagram showing a second exemplary implementation for mapping color data.

The flow chart of FIG. 5 illustrates a further exemplary implementation, wherein a method 500 is employed to map color data. At block 502, a first image 202, 204 consisting of color information is received, typically by a printer, from a workstation or print server 102. The color information forming the first image may be in RGB, CMYK or other format, and may include intent information 206.

At block 504, a look-up table 302–308 is selected from a library 224, wherein the look-up table corresponds to a desired rendering intent indicated by the intent data 206, and contains color mapping information. The rendering intent may be selected from any known or developed rendering intent, such as a default intent 302, a device specific or indicated intent 304, CMYK default 305, SWOP 306 (specifications web offset printing), CMYK device 307 or European standard press 308.

At block 506, the first image 202 or 204 is rendered according to the intent information 206, thereby forming a second image 310 within an intent and format independent working color space 218. The rendering may be performed with the look-up table selected at block 504, using rendering procedure 222, or by use of a similar procedure configured for such rendering or mapping. As seen above, the intent and format independent working color space 218 is fixed in size. As a result, where a color within the image 202 or 204 is fully saturated, it will be mapped to an edge of the fixed size intent and format independent working color space 218. Accordingly, the saturation of the color within the image 202 or 204 is noted in the data within the intent and format independent working color space 218, without having any attached intent file, indicator or flag.

At block 508, a look-up table 312–318 is selected from a library 228, wherein the look-up table includes gamut mapping information, and corresponds to a desired media type such as standard, preferred, photo quality or gloss. The desired media type may include any media type, examples of a limited number of such media types include standard (paper quality) 312, preferred 314, photo quality 316 or gloss 318.

At block 510, the second image file 310 is rendered from the intent and format independent working color space 218 into a third image file 320 within the media dependent working color space 310. During the rendering, media information is added to the data, making the data dependent on being output on a specific media type. The rendering may be performed with the look-up table 312–318 selected at block 508, using rendering procedure 226 or similar module configured for such mapping.

At block 512, data associated with the third image 320—contained within the media dependent working color space 220—is transferred to an output image or stream by a data transfer procedure 322 or similar. Device ready bits, contained within the output image or stream, may be used to write to a file or to drive a print engine 214.

Figure 6:
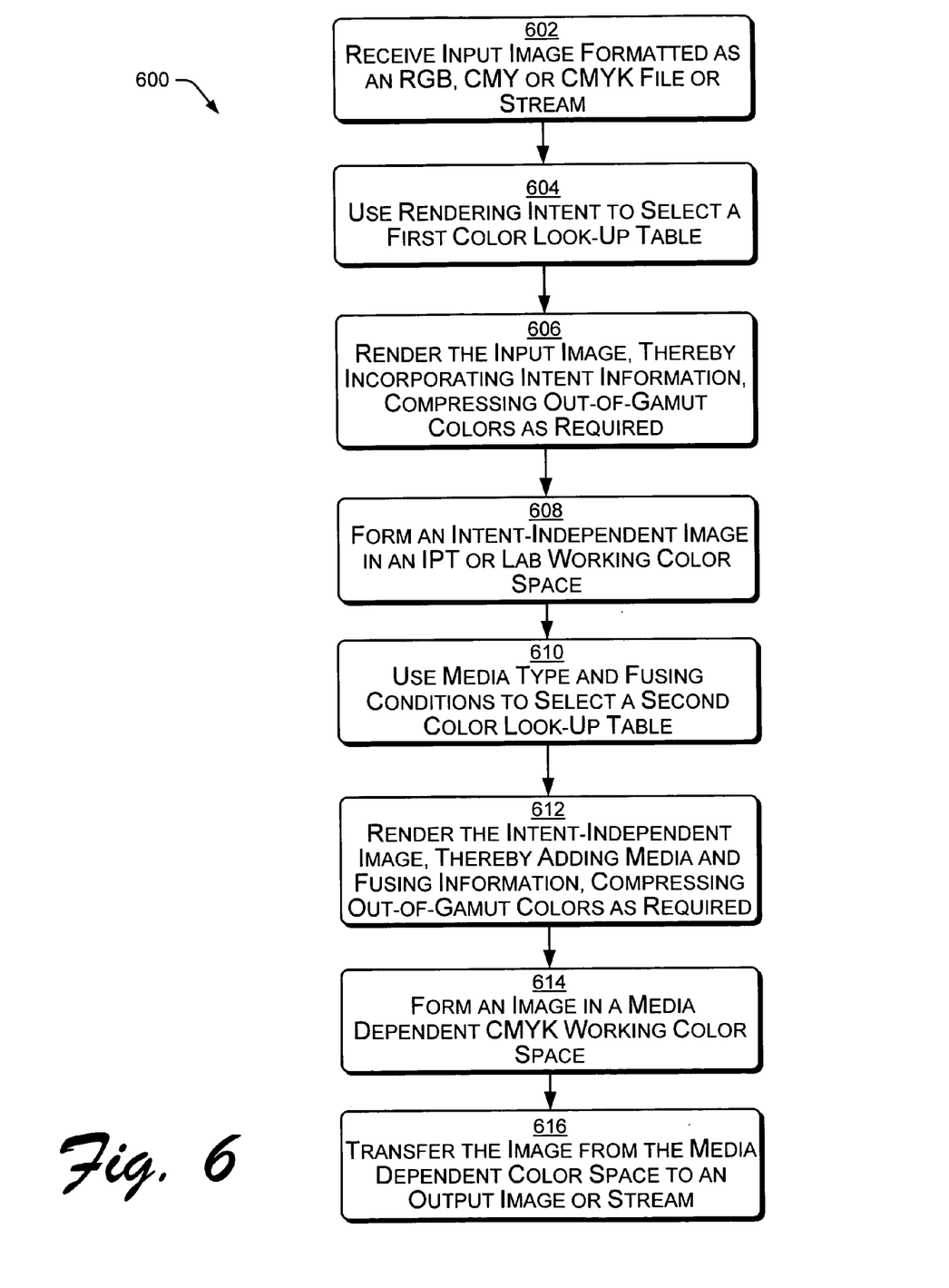
FIG. 6 is a flow diagram showing a third exemplary implementation for mapping color data.

The flow chart of FIG. 6 illustrates a further exemplary implementation of a method 600 to map color data. At block 602, input information is received, typically formatted as a first image formed of RGB, CMY or CMYK data in a file or stream.

At block 604, rendering intent is used to select a first color look-up table 302–308. Information on the desired rendering intent may be obtained at block 602, along with the input information. The rendering intent may be related to a default 302, a specific device 304, CMYK default 305, a SWOP 306, CMYK device 307, European standard press 308 or any other desired rendering intent.

At block 606, the first image is rendered and gamut mapped, thereby adding intent information 206. The intent information 206 is added by use of the first look-up table 302–308 from the intent library 224, which inherently supplies the intent information. In the course of the rendering process, out-of-gamut colors are compressed, as required.

At block 608, as a result of the rendering of the first image, an intent-independent second image 310 is formed in an intent and format independent working color space 218 in an IPT, Lab, CIE CAM or alternate format.

At block 610, media type and fusing conditions are used to select a second color look-up table 312–318 from the media type library 228. Information on the media upon which the output will be printed may be obtained at block 602, along with the input information. The intended media may be related to a standard media 312, a preferred (quality) media 314, a photo quality media 316, a gloss media 316 or other media type, as available.

At block 612, the second image 310 contained in the intent and format independent working color space 218 is rendered, thereby adding media and fusing information. The media and fusing information is added by operation of the second color look-up table 312–318, which inherently supplies the media information. In the course of the gamut mapping process, out-of-gamut colors are compressed, as required.

At block 614, as a result of the rendering of the second image 310, a media dependent third image 320 is formed in a CMYK working color space, such as the media dependent working color space 220.

At block 616, data associated with the third image 320—contained within the media dependent working color space 220—is transferred to an output image or stream. Device ready bits, contained within the output image or stream, may be used to write to a file or to drive a print engine 214.

Although the disclosure has been described in language specific to structural features and/or methodological steps, it is to be understood that the appended claims are not limited to the specific features or steps described. Rather, the specific features and steps are exemplary forms of implementing this disclosure. For example, while IPT, Lab and other specific examples of color spaces have been disclosed, it is clear that in many cases, an alternative color space could be substituted.

Additionally, while one or more methods have been disclosed by means of flow charts and text associated with the blocks, it is to be understood that the elements of the method may be performed by any desired means, such as by a hardware device such as an ASIC or the execution of processor-readable instructions defined on a processor-readable media, such as a disk, a ROM or other memory device. Also, actions described in some blocks may be performed in parallel with actions described in other blocks, may occur in an alternate order, or may be distributed in a manner which associates actions with more than one other block.

The invention claimed is:

1. A processor-readable medium comprising processor-executable instructions for rendering color data, the processor-executable instructions comprising instructions for:
    rendering input color data, using rendering intent information, into a second image within an intent and format independent working color space; and
    rendering the second image, according to a desired media type, into a third image within a media dependent color space.

2. The processor-readable medium of claim 1, wherein the intent and format independent working color space is fixed in size.

3. The processor-readable medium of claim 1, wherein a format of the second image within the intent and format independent working color space is not dependent on a format of the input color data.

4. The processor-readable medium of claim 1, wherein rendering input color data comprises instructions for:
    rendering fully saturated colors within the input color data to a surface of the intent and format independent working color space.

5. The processor-readable medium of claim 1, wherein rendering input color data comprises instructions for:
    selecting a look-up table from an intent library including default, device, SWOP or European standard press look-up tables.

6. The processor-readable medium of claim 1, wherein rendering the second image comprises instructions for:
    selecting a look-up table from a media type library including standard, preferred, photo quality or gloss look-up tables.

7. A processor-readable medium comprising processor-executable instructions for rendering color information, the processor-executable instructions comprising:
    selecting a first look-up table corresponding to a desired rendering intent;
    rendering input information according to the desired rendering intent into an intent and format independent working color space having a fixed size, wherein saturated colors within the input information are rendered to a surface of the intent and format independent working color space;
    selecting a second look-up table corresponding to an intended media type; and
    rendering data within the intent and format independent working color space according to the intended media type to produce color data within a media dependent working color space.

8. The processor-readable medium of claim 7, wherein selecting the first look-up table comprises instructions for:
    selecting the first look-up table from among a group including: default, device, SWOP or European standard press.

9. The processor-readable medium of claim 7, wherein selecting the second look-up table comprises instructions for:
    selecting the second look-up table from among a group including: standard, preferred, photo quality and gloss.

10. The processor-readable medium of claim 7, additionally comprising instructions for:
    transferring information from the media dependent working color space to an output image or stream.

11. A method of rendering color data, comprising:
    using a rendering intent to select a first color look-up table;
    rendering an input image with the first color look-up table to form an image within an intent and format independent working color space;
    using media type and fusing information to select a second color look-up table; and
    rendering the image within the intent and format independent working color space, using the second color look-up table, thereby forming an image in a media dependent working color space.

12. The method of claim 11, wherein:
    the intent and format independent working color space has a fixed size, and has a format that is independent of a format of the input image; and
    the media dependent working color space has a CMYK format.

13. The method of claim 11, additionally comprising:
    receiving the input image formatted as an RGB, CMY or CMYK file or stream.

14. The method of claim 11, wherein rendering the input image comprises:
    rendering saturated colors within the input image to colors on an edge of the intent and format independent working color space.

15. The method of claim 11, wherein:
    selection of the first color look-up table is made from a library including default, device, SWOP or European standard press look-up tables; and
    selection of the second color look-up table is made from a library including standard, preferred, photo quality or gloss look-up tables.

16. A color rendering apparatus, comprising:
- means for rendering an input image, using rendering intent information, into a second image within an intent and format independent working color space; and
- means for rendering the second image, according to a desired media type, into a third image within a media dependent color space.

17. The color rendering apparatus of claim 16, wherein the intent and format independent working color space is fixed in size.

18. The color rendering apparatus of claim 16, wherein a format of the second image within the intent and format independent working color space is not dependent on a format of the input image.

19. The color rendering apparatus of claim 16, additionally comprising:
- means for driving a print engine with data from the third image.

20. The color rendering apparatus of claim 16, additionally comprising:
- means for selecting a look-up table, with which to transform the input image into the intent and format independent working color space, from among an intent library including: default, device, SWOP or European standard press look-up tables; and
- means for selecting a look-up table, with which to transform the second image into the media dependent working color space, from among a media type library including: standard, preferred, photo quality or gloss look-up tables.

21. The color rendering apparatus of claim 16, additionally comprising:
- means for rendering fully saturated colors within the input image to a fixed surface of the intent and format independent working color space.

22. A color rendering apparatus, comprising:
- an intent library containing a look-up table configured to map RGB or CMYK image data into an intent and format independent working color space having a fixed size;
- a media type library containing a look-up table configured to map image data from the intent and format independent working color space into a media dependent working color space; and
- a color rendering control procedure configured to utilize color look-up tables from both the intent library and the media type library to perform first and second renderings on an input file, respectively, wherein the first rendering results in intent and format independent output and the second rendering results in media dependent output.

23. The color rendering apparatus of claim 22, wherein the color rendering procedure is additionally configured to:
- select a first look-up table from among a group including: default, device, SWOP or European standard press, found in the intent library; and
- select a second look-up table from among a group including: standard, preferred, photo quality or gloss, found the media type library.

24. A color map library comprising:
- an intent library containing an intent color look-up table configured to map RGB or CMYK color image data into an intent and format independent working color space; and
- a media type library containing a media color look-up table configured to map data from the intent and format independent working color space into a media dependent working color space.

25. The color map library of claim 24, wherein the intent and format independent working color space is fixed size.

26. The color map library of claim 24, wherein the intent library comprises:
- look-up tables configured for default, device, SWOP or European standard press mapping.

27. The color map library of claim 24, wherein the media type library comprises:
- look-up tables configured for standard, preferred, photo quality or gloss mapping.

28. A printer, comprising:
- a processor;
- memory;
- a color mapping apparatus, configured within the memory and executed by the processor, comprising:
  - an intent library, including an intent color look-up table, wherein the intent color look-up table is configured to render RGB or CMYK color data into an intent and format independent working color space having a fixed size;
  - a media type library, including a media color look-up table, wherein the media color look-up table is configured to render data from the intent and format independent working color space into a media dependent working color space; and
  - a color rendering control procedure to transform data using the intent library and the media type library; and
- a print engine configured to receive information from the color mapping apparatus.

* * * * *